United States Patent [19]

Fukamachi et al.

[11] Patent Number: 4,790,737

[45] Date of Patent: Dec. 13, 1988

[54] APPARATUS FOR MANUFACTURING REINFORCED HOSE

[75] Inventors: Satoshi Fukamachi, Shizuoka; Kenichi Mitsui, Ichinomiya; Kunihiro Matsuo, Inazawa; Kazumi Korenaga, Ichinomiya, all of Japan

[73] Assignee: Toyoda Gosei Co., Ltd., Nishikasugai, Japan

[21] Appl. No.: 67,869

[22] Filed: Jun. 30, 1987

[30] Foreign Application Priority Data

Jun. 30, 1986 [JP] Japan .......................... 61-100731[U]

[51] Int. Cl.[4] .............................................. B29C 47/04

[52] U.S. Cl. ................................ 425/114; 425/133.1; 425/376.1; 425/380; 425/462; 425/467

[58] Field of Search .................... 425/114, 133.1, 204, 425/208, 376 R, 376 B, 462, 466, 467, 380; 264/173, 174; 156/149, 431

[56] References Cited

U.S. PATENT DOCUMENTS

| | | | |
|---|---|---|---|
| 2,456,141 | 12/1948 | Myerson | 425/133.1 |
| 2,887,720 | 5/1959 | Gottmanns | 425/376 R |
| 4,057,376 | 11/1977 | Berger | 425/204 X |
| 4,322,202 | 3/1982 | Martinez | 425/462 X |
| 4,405,547 | 9/1983 | Koch et al. | 425/462 X |
| 4,472,126 | 9/1984 | Mitsui et al. | 425/114 |
| 4,517,039 | 5/1985 | Satzler | 425/133.1 X |
| 4,548,568 | 10/1985 | Herbert et al. | 425/462 X |
| 4,591,487 | 5/1986 | Fritsch | 425/204 X |
| 4,652,224 | 3/1987 | Golisch | 425/466 X |

FOREIGN PATENT DOCUMENTS

| | | | |
|---|---|---|---|
| 2557718 | 7/1976 | Fed. Rep. of Germany | 425/133.1 |
| 3211448 | 9/1983 | Fed. Rep. of Germany . | |
| 56-112829 | 7/1981 | Japan . | |

OTHER PUBLICATIONS

Transcript of Record in the United States Court of Customs and Patent Appeals, Patent Appeal Docket No. 79-593; In re Application of Masatoshi Kamon et al., Appeal from Board of Appeals; Ser. No. 644,090 26 Sheets Containing 46 Pages of Transcript.

*Primary Examiner*—Richard L. Chiesa
*Attorney, Agent, or Firm*—Cushman, Darby & Cushman

[57] ABSTRACT

In an apparatus for manufacturing a reinforced hose, a reinforcing layer-forming device is arranged so as to be concentric with the material efflux port of an outer tube extruder and an inner tube extruder so that inner tube formation, the reinforcing layer formation and the outer tube extruding can be performed continuously and nearly at the same time on a torpedo projected beyond the top end of an inner die of the inner tube extruder. A plurality of extrusion passages into which screws of the extruder is inserted are formed in a cylinder of the inner tube extruder along the extended axial line of an inner head for investing an inner tube of the reinforced hose with a multi-layer structure.

5 Claims, 5 Drawing Sheets

50
79a
81a
83a
85
85a
69a
51
87a
90
155
157
153
151
159
159
159
159
150
161
163

APPARATUS FOR MANUFACTURING REINFORCED HOSE

BACKGROUND OF THE INVENTION

The present invention is concerned with an apparatus for manufacturing a so-called consecutive-type reinforced hose, and more particularly, to an apparatus for manufacturing a reinforced hose wherein: a torpedo is formed to protrude from a top end of an inner die of a inner tube extruder; an outer tube extruder has its material efflux port which is composed by an intermediate die and an outer die in such a way that it is disposed in the vicinity of the inner die but outside the outer periphery of the torpedo; and a reinforcing layer-forming device, capable of implanting reinforcing threads led out through a gap formed between the intermediate die and the inner die into the inner tube immediately after the extrusion has been performed, is so disposed as to be concentric with a cylinder of the inner tube extruder.

The above-described apparatus for manufacturing the reinforced hose has already been filed for patent by the applicant of the present application and hence the contents thereof have become broadly known (See Japanese Patent Publication No. 50132/1985, which is believed to be equivalent to the U.S. Patent of Mitsui et al, U.S. Pat. No. 4,472,126, issued Sept. 18, 1984).

Referring now to FIG. 1, there is sectionally depicted a reinforced hose manufacturing apparatus 1.

A torpedo 7 is formed in such a manner that it projects from the tip end of an inner die 5 of an inner tube extruder 3. An outer tube extruder 11 is arranged such that a material efflux port 17 constituted by an intermediate die 13 and an outer die 15 is disposed in close proximity to the inner die 5 but outside the outer periphery of the torpedo 7. A spiral device 21 is placed so that reinforcing threads F1, F2 led out through a gap between the intermediate die 13 and the inner die 5 can be implanted into the inner tube immediately after the extrusion has been effected.

In the inner tube extruder 3, the torpedo 7 is attached to a head 6 secured to the tip end of a cylinder 4, and the inner die 5 is fitted to the head 6. In the outer tube extruder 11, the intermediate die 13 and the outer die 15 are respectively mounted to the head 6 with the help of die holders 18, 19.

A reinforced hose A (for instance, a fuel hose suited to an automobile) manufactured by the thus-constructed manufacturing apparatus 1, as illustrated in FIG. 2, assumes a trilaminar structure, i.e., an inner tube B (nitrile rubber; NBR), a reinforcing layer C and an outer tube D (epichlorohydrin rubber; CO).

As for the fuel hose, there is recently a demand for the improvement in property to resist its deterioration by gasoline and for making the inner tube B polychromatic (for example, an NBR layer, a hyperon and a CSM layer are laminated from the side of its inside diameter) in terms of enhancing the bonding properties with respect to the outer tube D.

Such a polychromatic inner tube B is, in general molded by use of a polychromatic extruder 23 depicted in FIG. 3. The polychromatic extruder 23 includes a first extruder 25 serving to mold a first layer $B_1$ (counted from the side of the inside diameter) of the inner tube B; and this first extruder 25 is equipped with a cylinder 26 disposed at an angle of 45° to the extended axial line (superposed on a mandrel 45) of the head 43. A second extruder 35 performing a function to mold a second layer $B_2$ is provided with its cylinder 36 disposed at an angle of 60° to the extended axial line of the head 43.

Such is the arrangement of the first extruder 25 that the cylinder, a feed roller 27 and a speed reducer 29 are coaxially placed; and a motor provided in parallel with these components is connected through a driving belt 31 to the speed reducer 29.

The second extruder 35 is constituted in such a way that the cylinder 36, a feed roller 37 and a power-conveying unit 38 are coaxially disposed; and a motor 40 is placed in parallel with the power-conveying unit 39. The speed reducer 39 is connected through a driving belt 41 to the power-conveying unit 38.

The thus-constituted polychromatic extruder 23 can not, however, be applied to the reinforced hose manufacturing apparatus 1 having such a configuration as illustrated in FIG. 1. The reason for this is that the cylinders 26, 36 of the individual extruders 25, 35 intersect each other and are secured to the head 43, thereby interfering with the spiral device 21.

SUMMARY OF THE INVENTION

An apparatus for manufacturing a reinforced hose according to the present invention includes an inner tube extruder defined as a polychromatic extruder in which a plurality of extrusion passages into which screws of the extruder are inserted are formed in a cylinder thereof along the extended axial line of a head.

It is a primary object of the present invention to provide an apparatus for manufacturing a reinforced hose which is capable of consecutively manufacturing the reinforced hoses each having a polychromatic inner tube by making such an arrangement that the screws for extruding materials are incorporated in a length of cylinder of the inner tube extruder defined as a polychromatic extruder, and the cylinder is concentrically provided in a reinforcing layer-forming device by minimizing the diameter of the cylinder to the utmost limit.

Another object of the present invention is to increase the strength of the cylinder of the inner tube extruder by increasing the diameter of the cylinder in order to obviate a defect wherein the tip end thereof can not be supported because of the presence of the reinforcing layer-forming device and the outer tube extruder with the result that it is difficult to obtain the desired mechanical strength.

DETAILED DESCRIPTION OF THE PREFERRED EMBODIMENT

An embodiment of the present invention will hereinafter be described.

Figure 5:
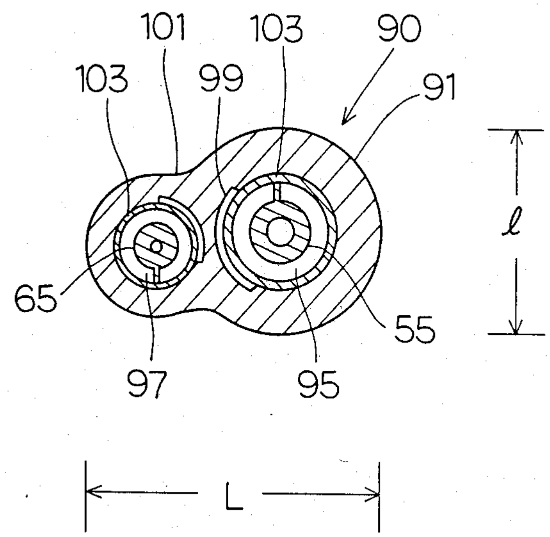
FIG. 5 is a sectional view taken substantially along the line V—V of FIG. 4.
Figure 4:
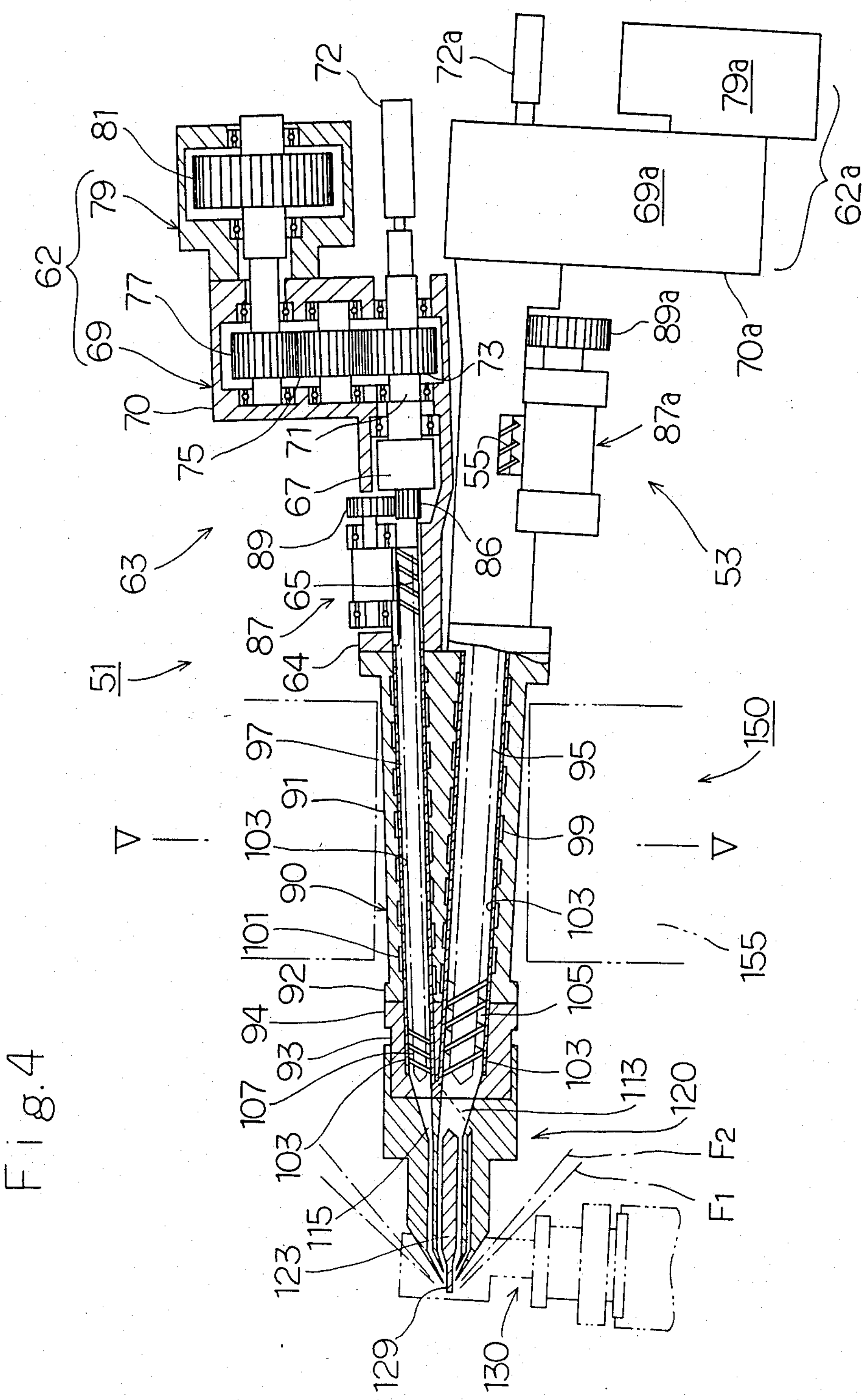
FIG. 4 is a partial plan view, in section of an inner tube extruder employed for an apparatus for manufacturing a reinforced hose in the embodiment of the present invention.
Figure 6:
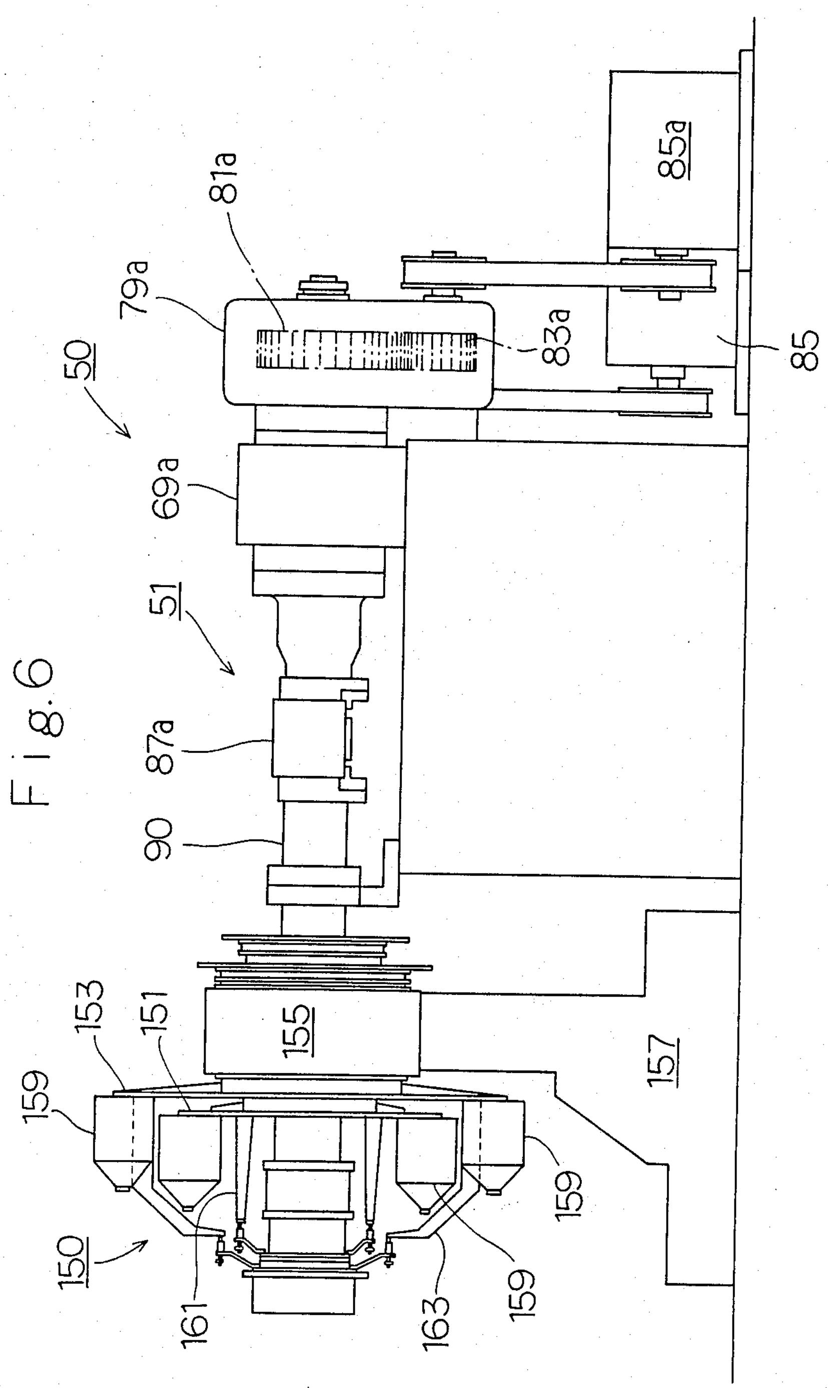
FIG. 6 is a side view showing a reinforced hose used in the embodiment.
Figure 7:
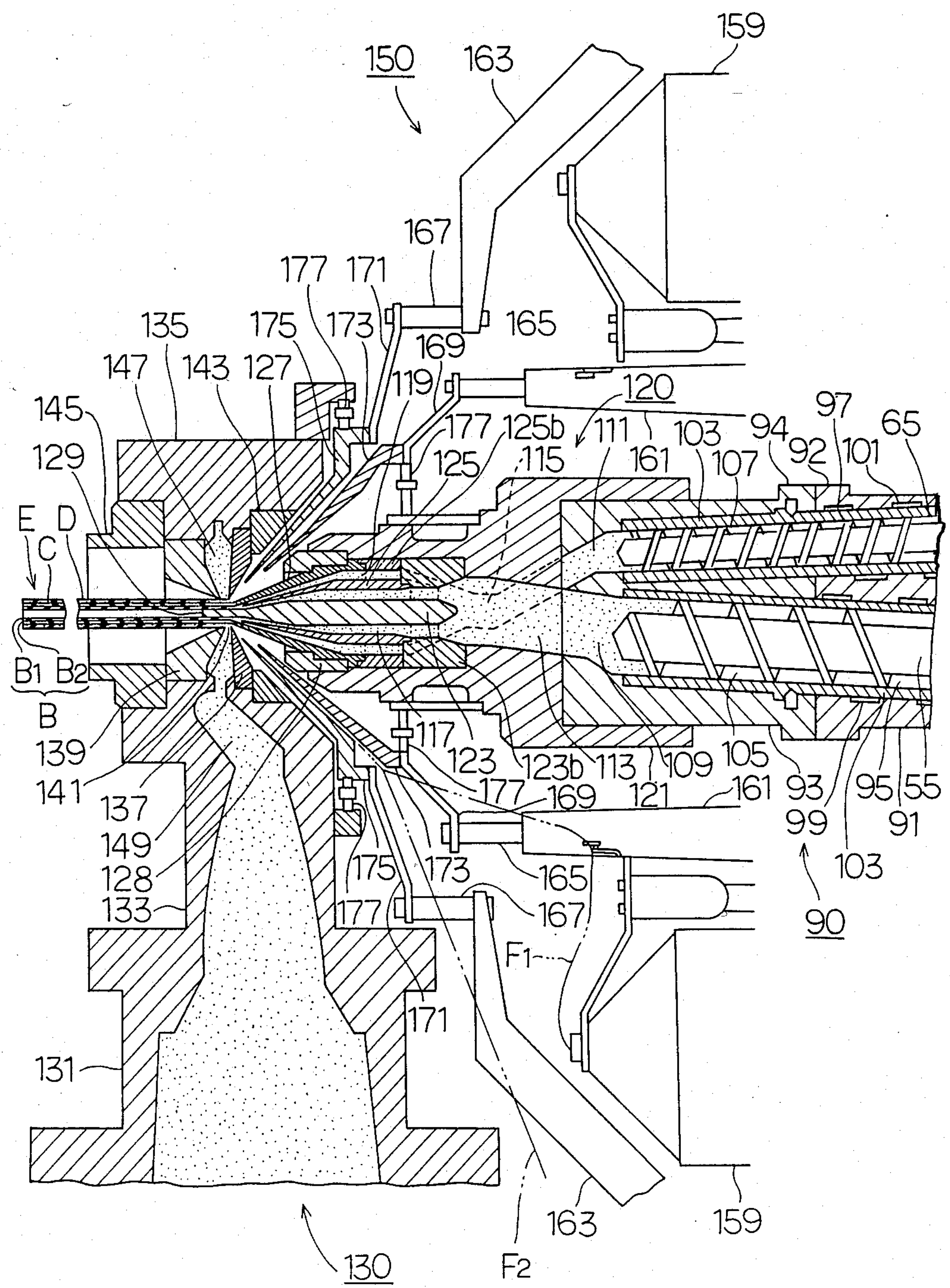
FIG. 7 is an enlarged sectional view showing a head of the inner tube extruder, a head of an outer tube extruder and a spiral device (a reinforcing layer forming device) which are employed in the embodiment.

FIG. 4 is a partial plan view, in section of an inner tube extruder 51 used for a reinforced hose manufacturing apparatus 50 in the embodiment. FIG. 5 is a sectional view taken substantially along the line V—V of FIG. 4. FIG. 6 is a side view of the reinforced hose manufacturing apparatus 50. FIG. 7 is an enlarged sectional view of a head.

This reinforced hose manufacturing apparatus 50 consists of the inner tube extruder 51, an outer tube extruder 130 and a spiral device 150.

The inner tube extruder 51 is, as illustrated in FIG. 4, equipped with a first extruder 53 for forming a first layer $B_1$ of an inner tube B and a second extruder 63 for forming a second layer $B_2$. Screws 55, 56 of the respective extruders 53, 63 are inserted into extrusion passages 95 to 105 and 97 to 107 which are formed in a cylinder 90 along the extended axial line of a head 120. The cylinder 90 is connected to the head 120, and the extrusion passages 15, 107 of the cylinder 90 communicate with material feeding passages 113, 115 bored in the head 120. It is to be noted that in the inner tube extruder 51 the extended axial line of the head 120 is equivalent to a line extending from a center mandrel 123 to a torpedo 129.

The extruders 53, 63 are different in size, depending on their processing capability, but adopt the same construction. The description of the second extruder 63 will now be made with reference to FIG. 4.

A bearing 67 is fixed to a proximal portion of the screw 65, and a conveying unit 69 is provided in the rear (the right side in the Figure) of the bearing 67. The conveying unit 69 is includes a first gear 73, a second gear 75 and a third gear 77 which are engaged with each other in a direction in which they extend away from the first extruder 53. The numeral 70 stands for a casing. The first gear 73 serving as one of the components of the conveying unit 69 is fitted to a driving shaft 71 which is so fixed to the rear portion of the bearing 67 as to be coaxial with the screw 65, thereby conveying the rotation of the first gear 73 to the screw 65.

It should be noted that a rotary joint which admits screw cooling water is secured to the driving shaft 71.

The third gear which partly constitutes the conveying unit 69 is axially fixed to a large diameter gear 81 of a speed reducer 79. The second gear 75 is in mesh with the first gear 73, and the third gear 77, respectively. Gear ratios of the three gears 73, 75, 77 exhibit no difference at all. Therefore, the first gear 73 rotates, synchronizing with the large diameter gear 81 of the speed reducer 79. The screw 65 is thus made to rotate by rotational driving means consisting of the conveying unit 69 and the speed reducer 79.

Figure 1:
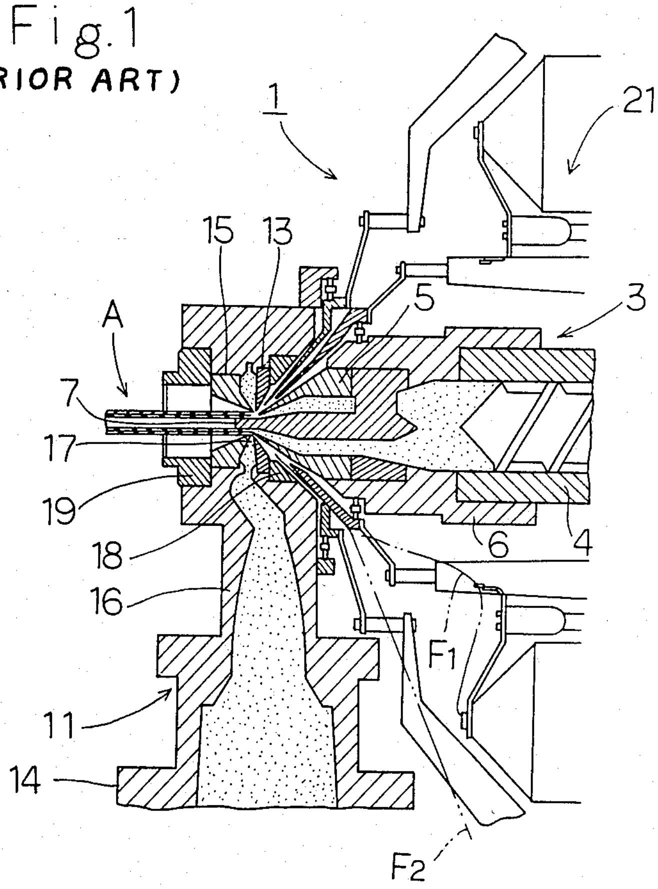
FIG. 1 is a sectional view of a conventional apparatus for manufacturing a reinforced hose.
Figure 3:
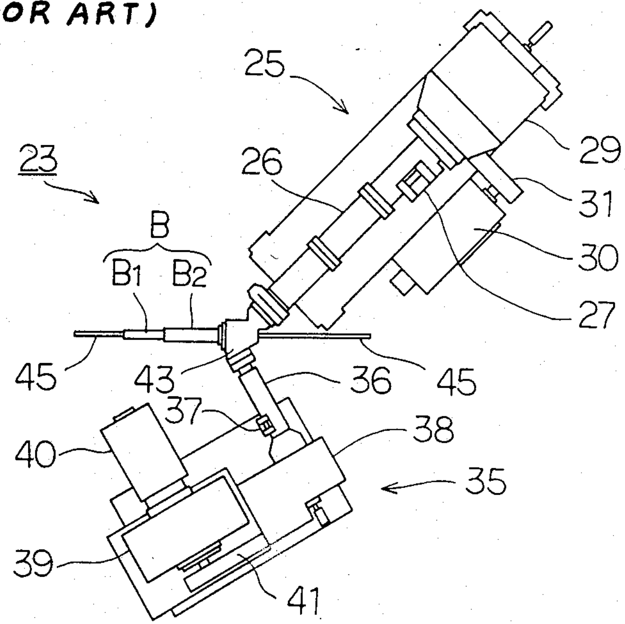
FIG. 3 is a plan view of a conventional polychromatic extruder.
Figure 2:
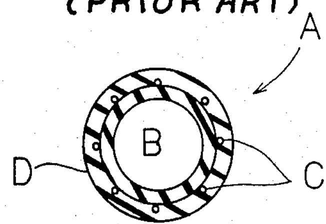
FIG. 2 is a cross-sectional view of a reinforced hose A manufactured by the apparatus illustrated in FIG. 1.

The large diameter gear 81 of the speed reducer 79 engages with an non-illustrated small diameter gear (see a positional relation between a large diameter gear 81a of the first extruder 53 shown in FIG. 3 and a small diameter gear 83a). This small diameter gear is driven by a motor 85.

A feed roller driving gear 86 is fixedly attached to the proximal portion of the screw 65 in front (the left side in the Figure) of the bearing 67 for the screw 65, in which position the gear 86 is in mesh with a gear 89 of the feed roller 87. Consequently, the feed roller 87 rotates in accompaniment with the rotation of the screw 65.

The feed roller 87 is disposed opposite to the first extruder 53 in a base 64 of the second extruder 63.

The structure of the first extruder 53 is, as explained earlier, identical with that of the second extruder 63; the same components to those of the second extruder 63 are indicated by the same numerals marked with "a", and the description is therefore omitted. A conveying unit 69a is provided apart from the second extruder 63; and rotational driving means 62, 62a of the extruders 53, 63 are radially disposed about the extended axial line of the head 120 and the cylinder 90 as well.

As is obvious from FIG. 4, no member standing vis-à-vis with the extruders 53, 63 exists. It is feasible to dispose the first and second extruders 53, 63 so that they are gradually brought close to each other while causing the screws 55, 65 to face in the same direction by shifting the positions of the rotational driving means 62, 62a.

The cylinder 90 will next be explained.

The cylinder 90 is constituted by a cylinder proximal portion 91 and a cylinder head 93. The cylinder proximal portion 91 assumes a peanut-like configuration in transverse cross-section wherein large and small semi-circles intersect (see FIG. 5). The extrusion passages are bored in the centers of such semi-circles, and these passages 95, 97 are brought close to each other on the side of the head 120, in which place the screws 55, 65 are inserted. In the peripheral walls of the extrusion passages 95, 97 are chased spiral grooves 99, 101; rigid liners 103 are further fitted therein; and the spiral grooves 99, 101 serve as passages for a heat medium (water, oil or the like), thus constituting temperature adjusting means.

Where forming materials of first and second layers are similar to each other in thermal properties such as a softening temperature and so on, the spiral grooves are arranged to be integral with each other instead of their being provided separately, and the whole cylinder proximal portion 91 is thermally adjusted. As a result, heat efficiency is improved, and such an arrangement brings about a decrease in cost of the equipment.

In contrast to the above-described case, if the thermal properties of the forming materials of the first and second layers are different from each other, it is desirable that an adiabatic layer (an air layer or the like) be formed between the forming walls of the extrusion passages 95, 97.

Inasmuch as the insertion of the screws 55, 65 of the extruders 53, 63 is effected along the extended axial line of the head 120, the cylinder proximal portion 91 gradually diminishes in outer peripheral diameter. For instance, when the diameter of the screw 55 is 7 cm and that of the screw 65 is 4 cm, the large diameter portion L of the cylinder proximal portion 91 is 25 cm, and the small diameter portion 1 is 18 cm (see FIG. 5).

Consequently, the cylinder proximal portion 91 can concentrically penetrate a cylindrical supporting member 155 of the spiral device 150 which is designed for manufacturing general hoses.

The consecutive hose manufacturing device has, in general such constraint that a member for supporting the cylinder can not be provided at the tip end of the cylinder of the inner tube extruder on account of the placement of the spiral device and the outer tube extruder. For this reason, it is difficult to obtain the increased mechanical strength of the cylinder. In the inner tube extruder 51 used in this embodiment, however, the cylinder 90 resultingly becomes thick because of the insertion of two lengths of the screws into the cylinder 90, thereby yielding an effect of increasing the strength.

The cylinder head 93 assuming a cylindrical configuration is fastened by the cylinder proximal portion 91 and the flanges 92, 94 (bolt fastening). The cylinder head 93 is formed with extrusion passages 105, 107 each communicating with the extrusion passages 95, 97, in which place the liners 103 are incorporated.

The tip ends of the screws 55, 65 of the extruders 53, 63 are inserted in until they reach the cylinder head 93.

At the tip end of the cylinder head 93, the extrusion passages 105, 107 are crooked to contract the diameter with the result that they communicate with the material feeding passages 113, 115 of the head 120.

The cylinder head 93 is formed with no spiral groove. However, if there arises a demand for precisely adjusting the temperature of the forming material, for instance, an non-illustrated cooling jacket is formed at the cylinder head 93.

Subsequently, the head 120, the outer tube extruder 130 and the spiral device 150 will be described with reference to FIG. 7.

The head 120 is equipped with a head body 121, a center mandrel 123, a first inner die 125 and a second inner die 127.

The material feeding passages 113, 115 of the cylinder head are bored in the head body 121 mounted (with a screw) to the tip end of the cylinder head 93. These material feeding passages 113, 115 respectively communicate with a first annular passage 117 formed by the center mandrel 123 and the first inner die 125 and with a second annular passage 119 formed by the first inner die 125 and the second inner die 127.

The center mandrel 123 positioned on the axial line of the head body 121 is connected through an non-illustrated spider to the annular supporting member **123*b*. This annular supporting member 123*b* is fastened to the head body 121** with an non-illustrated position-adjusting bolt or the like.

From the tip end of the center mandrel 123 is protruded the torpedo 129 having its outside diameter which determines an inside diameter of the hose E; and this torpedo 129 extends a bit more protrusively than the outer die 139. In order to make variable the inside diameter of the hose E, the torpedo 129 and the center mandrel 123 may be formed separately (these two members are fastened with a screw), and the outside diameter of the torpedo 129 may further be varied to a desired value. The first inner die 125 is so disposed at a predetermined spacing (the first annular passage 117) as to be concentric with the center mandrel 123. This first inner die 125 is connected through an non-illustrated spider to the annular supporting member **125*b* which is fastened to the head body 121** with the non-illustrated position adjusting bolt.

The second inner die 127 is likewise so disposed at a predetermined spacing (the second annular passage 119) from the first inner die 125 as to be concentric with the center mandrel 123. This second die 127 is fastened to the head body 121 with the position-adjusting bolt.

In the Figure, the numeral 128 denotes a fixing nut.

The head 131 of the outer tube extruder 130 is fitted to a cylinder (not illustrated) of a general type of extruder. This head 131 consists of a material-introducing member 133 and a cylindrical member 135. The cylindrical member 135 is provided with an intermediate die 137 and an outer die 139; and the approach to the second inner die 127 is possible by virtue of the two dies 137, 139. A material efflux port 141 is formed in a position outside the outer periphery of the torpedo 129. It is to be noted that the intermediate die 137 and the outer die 139 are respectively held by die holders 143, 145.

The cylindrical member 135, the intermediate die 137 and the outer die 139 are combined to form an annular passage 147 which communicates with the material feeding passage 149 shaped in the material introducing member 133.

A spiral device 150 (see FIG. 6) is composed by an inner bobbin carrier 151 and an outer bobbin carrier 153 which are rotatably supported on a cylindrical supporting member 155. The numeral 157 designates a supporting board. The bobbin carriers 151, 153 are equipped with, for instance, a dozen of bobbins 159 capable of leading out reinforcing threads F1, F2.

Two pairs of driving arms 161, 163 vertically extend from the bobbin carriers 151, 153, respectively. Inner and outer spinners 173, 175 are fixed through shafts 165, 167 and through spinner arms 169, 171 to the tip ends of the driving arms 161, 163. Each of the spinners 173, 175 takes a conical trapezoidal configuration and remains inserted between the head 120 of the inner tube extruder 51 and the head 131 of the outer tube extruder 130 so as not to interfere with them. A dozen thread holes (not illustrated) through which the reinforced threads F1, F2 are led are formed at equal pitches in the tip ends of the spinners 173, 175.

In the Figure, the numeral 177 represents a bearing.

As a reinforcing layer forming device, the spiral device 150 has heretofore been exemplified for description. As a matter of course, a braiding machine can similarly be disposed such as to be concentric with the cylinder 90 of the inner tube extruder 51.

Figure 8:
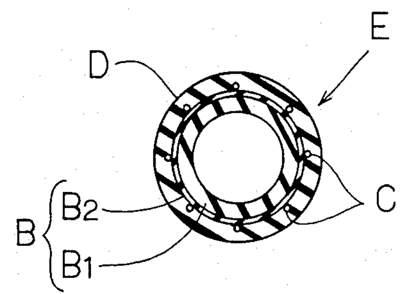
FIG. 8 is a cross-sectional view of a reinforced hose E manufactured by the reinforced hose manufacturing apparatus of the embodiment.

A mode in which the above-mentioned reinforced hose manufacturing apparatus 50 is utilised will now be explained. FIG. 8 is a sectional view of the reinforced hose E manufactured by the apparatus 50.

In the inner tube extruder 51, the first layer forming material (for example, NBR) of the reinforced hose E is fed out via the extrusion passage 105, the material feeding passage 113, the first annular passage 117 and an orifice constituted by a first die 125 and the torpedo 129 by means of the screw 55 of the first extruder 53, whereby the first layer $B_1$ is formed.

Immediately after this process has been effected, the second layer forming material (for example, CSM) is fed out via the extrusion passage 107, the material feeding passage 115, the second annular passage 119 and an orifice constituted by the first die 125 and a second die 127 by means of the screw 65 of the second extruder 63, whereby the second layer $B_2$ is formed on the outer periphery of the first layer $B_1$.

In the thus-shaped inner tube B having a bilaminar structure is formed a reinforced layer C having a spiral structure by implanting the reinforcing threads (for instance, saturated polyester resin fiber) led out of the respective bobbins 159 of the spiral device 150.

Subsequently, almost at the same moment the outer tube extrusion material (for instance, CO) of the outer tube extruder 130 is fed out via the material feeding passage 149, the annular passage 147 and the material efflux port 141, thereby forming an outer tube D.

The extrusion passages 95 to 105 and 97 to 107 of the cylinder 90 are formed along the extended axial line of the head 120 so that they are brought close to each other on the side of the head 120. A route through which the respective forming materials of the inner tube flow is constituted such as: the extrusion passages 95 to 105→material feeding passage 113→annular passage 117; and another route is constituted such as: the extrusion passages 97 to 107→material feeding passage 115→annular passage 119. Owing to the above-described arrangement, each of the two routes gradually assumes rectilinearity. In consequence, the forming materials of the inner tube B smoothly flow after being pushed out of the cylinder 90, and the non-uniformity in thickness is unlikely to be created in the layers $B_1$, $B_2$.

The formation of the reinforcing layer and the outer tube is effected on the torpedo 129 which is so shaped as to be more protrudent than the second die 119, and hence the inner tube B is by no means crushed. The outer tube D is formed on the inner tube B just after the extrusion has been performed, so that a favourable property of bonding the inner tube B to the outer tube D can be obtained.

The description so far made is focused on the biaxial type inner tube extruder, and the variation thereof may include a triaxial type or a quadriaxial type.

In addition, the present disclosure relates to the subject matter disclosed in Japanese Utility Model Application No. Sho 61-100731 filed on June 30, 1986 (from which priority is claimed herein) the entire specification of which is incorporated herein by reference.

What is claimed is:

1. An apparatus for manufacturing a reinforced hose, which comprises:

an inner tube extruder including:

a fixed torpedo member for forming a hollow within a hose;

an inner die for forming an inner tube structure, said torpedo member having an exterior end which projects beyond an exterior end of said inner die, said inner die being positioned about the torpedo member; and a cylinder formed with a plurality of extrusion passages connected to an inner head whose extended longitudinal axis serves as its longitudinal axis, said inner head being formed with a plurality of extrusion passages through which screws of said extruder are inserted in such a way that said extrusion passages are arranged along the extended longitudinal axis, partition means in said cylinder and inner head laterally separating said extrusion passages from one another;

an outer tube extruder positioned about the torpedo member, said outlet tube extruder having an outlet positioned downstream from said inner tube extruder so that a gap is formed therebetween, said outer tube extruder outlet including an intermediate die and an outer die for forming an outer tube over a just-extruded inner tube extended, in use, by said inner tube extruder; and a reinforcing layer-forming device, disposed such as to be concentric with the cylinder of said inner tube extruder, for leading-out reinforcing threads through a gap between said intermediate die and said inner die, said reinforcing layer-forming device being capable of implanting said threads into said inner tube immediately after extrusion of said inner tube.

2. An apparatus for manufacturing a reinforced hose as set forth in claim 1, wherein:

there are two said extrusion passages formed in said cylinder of said inner tube extruder.

3. An apparatus for manufacturing a reinforced hose as set forth in claim 2, further including:

means for rotationally driving said screws, said driving means being radially disposed about the extended longitudinal axis of said cylinder.

4. The apparatus of claim 3, wherein:

said screws are of helically opposite sense for being counter-rotated by said driving means.

5. The apparatus of claim 3, wherein:

said extrusion passages are arranged in an acute angle to one another, which angle converges in a downstream direction of said inner tube extruder.

* * * * *